Dec. 1, 1925.
E. F. FONES
1,563,617
CULTIVATOR FENDER
Filed Nov. 10, 1924
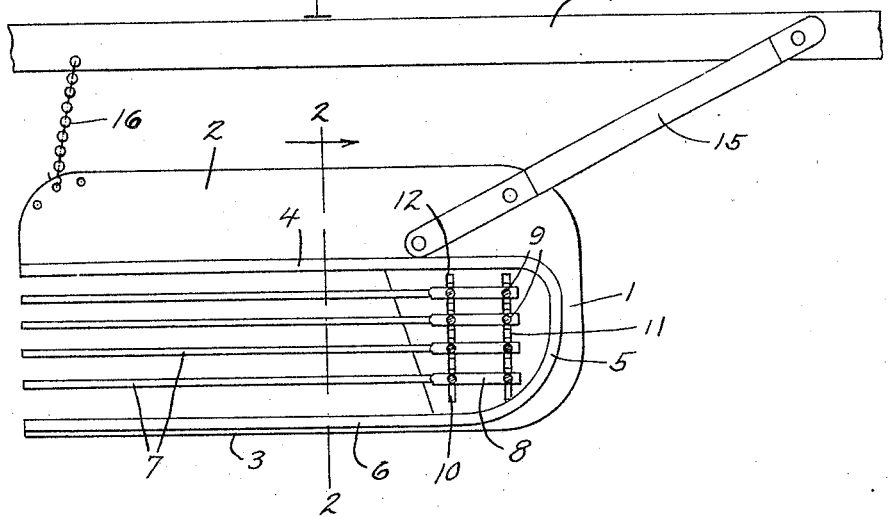
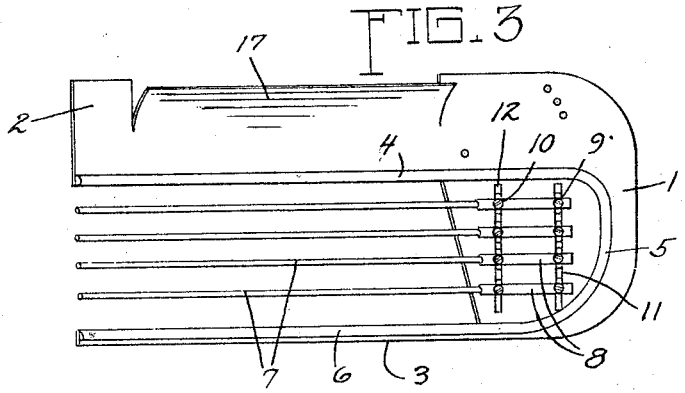
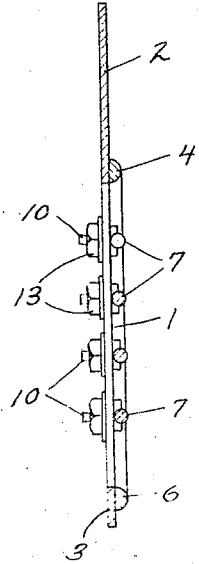
INVENTOR.
Edward F. Fones,
BY Walter N. Haskell.
his ATTORNEY.

Patented Dec. 1, 1925.

1,563,617

UNITED STATES PATENT OFFICE.

EDWARD F. FONES, OF GENESEO, ILLINOIS.

CULTIVATOR FENDER.

Application filed November 10, 1924. Serial No. 748,847.

*To all whom it may concern:*

Be it known that I, EDWARD F. FONES, a citizen of the United States, residing at Geneseo, in the county of Henry and State of Illinois, have invented certain new and useful Improvements in a Cultivator Fender, of which the following is a specification.

My invention has reference to a cultivator fender, and is more specially designed for the protection of small corn, when it is being cultivated, but it can be adapted for use with other cereals or vegetables, when the same are being tilled in their early stages. Its chief purpose is to increase the efficiency and effectiveness of such devices, and enable the work of cultivating a field of grain to be accomplished in a less period of time than is ordinarily the case.

A further and special object of the invention is to provide a fender which will pursue a direct course, and not swerve inwardly at its rear end so as to drag on the young corn, as is frequently the case with cultivator shields now in use.

Another purpose thereof is to provide a fender which can be readily adapted to different heights of corn and varying conditions of soil.

Another purpose thereof is to provide a device which will work perfectly in what is known as a "trashy" field, and will not encumber itself with weeds and other refuse.

The above-named, and other features and advantages of the invention, will more fully appear from the following specification, reference being had to the accompanying drawings, in which:

Fig. 1 shows the invention in side elevation.

Fig 2 is a cross-section on the broken line 2—2 of Fig. 1.

Fig. 3 is a view similar to Fig. 1, showing a modified arrangement of the device.

The invention comprises a body portion 1, formed of sheet metal of suitable weight and strength, which is projected rearwardly at its upper end into a guard-plate 2, and at its lower end into a blade 3. The lower edge of the plate 2 is reinforced by a metal beading 4, which is curved downwardly upon the part 1 at 5, and rearwardly again along the part 3 as at 6.

In the space between the plate 2 and blade 3 is a series of rods 7, provided at their forward ends with flattened portions 8, perforated to receive small bolts 9 and 10, which pass through slots 11 and 12 in the plate 1, and are held therein by nuts 13 on the opposite face of said plate.

The fender can be attached to the beam of a cultivator in any desired manner, suitable for the purpose thereof. In Fig. 1 a part 14 of the cultivator is indicated, to which the forward end of the fender is connected by a draw-bar 15, having a pivotal connection with the part 14, while at the rear end is a chain connection 16. This permits a limited vertical play of the fender.

The rods 7 are preferably formed of metal possessing a limited amount of resiliency, and the double support thereof on the plate 1 renders the same less liable to breakage. The positions of said rods can also be varied to suit the requirements, and extra rods can be put in or taken out, as desired. When the plants are young a greater amount of protection is required, and the rods are set closely enough together to permit nothing but the finer dirt to sift through.

The blade 3 acts as a runner, just beneath the surface of the earth, and serves as a guide for the fender, preventing the same from getting out of alignment. The form of the fender is such that it will run readily through morning glories and other rubbish, without becoming entangled therewith.

For use in damp or wet soil, the particles of which are liable to be thrown to a greater height by the cultivating devices, the part 2 is provided with an outwardly bent portion 17, as shown in Fig. 3, which acts as an additional fender for the clods or pieces which might go over the top of the plate 2.

By the use of the invention it is possible to proceed continuously with the cultivating work, without the necessity of stopping occasionally to uncover a hill of young corn. The cultivator can be operated with a team of horses on a fast walk, and a relatively greater amount of the field cultivated in a given time.

In case of breakage of any of the rods 7, new ones can be quickly substituted therefor.

What I claim, and desire to secure by Letters Patent, is:

A device of the class described, comprising a body portion, formed of sheet metal, provided with a pair of transverse slots; a guard plate projected rearwardly from the upper part of said body member; a runner blade projected rearwardly from the lower edge thereof and adapted to operate in the ground, to act as a guide for the fender; a series of rods provided with fastening means secured in said slots, so as to be capable of adjustment therein; and a reinforcement strip, extending along the lower edge of said guard plate, transversely of said body member, and longitudinally of said runner blade.

In testimony whereof I affix my signature.

EDWARD F. FONES.